April 8, 1930.  R. STRESAU  1,754,206
COVERED WELDROD FOR ELECTRIC ARC WELDING
Original Filed March 12, 1925

INVENTOR.
Richard Stresau
BY
ATTORNEY.

Patented Apr. 8, 1930

1,754,206

UNITED STATES PATENT OFFICE

RICHARD STRESAU, OF WAUWATOSA, WISCONSIN, ASSIGNOR TO A. O. SMITH CORPORATION, OF MILWAUKEE, WISCONSIN, A CORPORATION OF NEW YORK

COVERED WELD ROD FOR ELECTRIC-ARC WELDING

Original application filed March 12, 1925, Serial No. 14,939. Divided and this application filed April 18, 1929. Serial No. 356,182.

This invention relates to covered metallic weldrods for electric arc welding and constitutes a division of the invention set forth in application Serial No. 14,939, filed March 12, 1925.

The object of the invention is to provide a weldrod with a covering which will desirably affect the welding arc and fusion of the metals.

Another object of the invention is to provide a covered weldrod which may be readily and economically manufactured.

The invention resides in a weldrod covered with a composition containing starch or a material having a relatively high starch content as the principal constituent thereof.

The covering of the weldrod is volatilized by the arc during the welding operation and tends not only to protect the welding metal being deposited by the arc from contamination from the air, but also tends to purify the metal from such materials as sulphur and phosphorous and non-metallic impurities.

The covering further functions to protect the carbon constituent of the weldrod metal from transformation and thereby prevents depletion of carbon in the weld metal, although the carbon constituent of the covering material does not add materially to the amount of carbon in the weld metal since the carbon containing starchy material of the weldrod covering is substantially volatilized by the arc during the welding operation.

Figure 1:
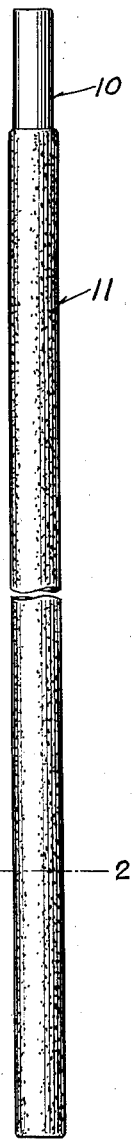
Figure 1 is a side elevation illustrating a weldrod made in accordance with the invention.
Figure 2:
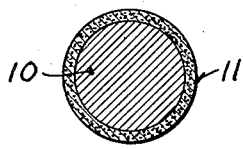
Fig. 2 is an enlarged transverse section on the line 2—2 of Fig. 1.
Figure 3:
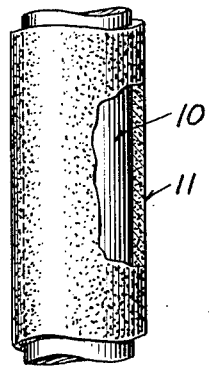
Fig. 3 is an enlarged view in elevation of a short intermediate section of the weldrod with the covering or coating broken away at one side.

Referring to the drawing, the numeral 10 indicates a length of rod which forms the metallic core of the improved weldrod. This rod conducts the electric current forming the metallic arc in the welding operation, and by means of the arc thus formed, the metal of the rod is fused with the metal of the work to be welded. In order to maintain an arc of constant value and thereby obtain uniform welding conditions, the rod is fed to the arc in the ratio of its fusion or consumption by the arc.

The rod preferably has a covering 11 formed thereon in any suitable manner such as by dipping, molding or extruding the same thereon in a manner similar to that disclosed in Patent No. 1,347,184 to R. S. Smith.

The covering comprises a plastic composition which contains, as its primary constituent, starch, preferably in the form of flour such as wheat or rye flour or other starchy vegetable flours. The starch is preferably mixed with sodium silicate or other suitable binder or combustion retarder and then applied on the weldrod while the mixture is still in a plastic condition. Other suitable ingredients may be added to the mixture, such as suitable fluxing materials or metals adapted to alloy with the weld.

After the covering is applied to the rod, the rod thus coated is preferably baked in a suitable oven, or otherwise dried to expel excess moisture, and to harden the covering so that the completed weldrods may be handled without injury to the covering. The more uniform the thickness and density of the covering on the weldrod, the better will be the effects resulting therefrom. The thickness of the covering may depend upon the size of the weldrod and the conditions under which the weldrod is to be employed.

During the welding operation, the covering forms a slowly disintegrating, sleeve-like, gas-retaining envelope, the unconsumed portion thereof constituting a crater-like formation which extends a short distance beyond the fusing end of the rod 10 at the time of its progressive fusion, and from which the molten metal flowing from the rod is projected in the form of finely divided, molten, metallic particles, or metallic vapor, upon and into the pool of the weld. The heat-resisting characteristic of sodium silicate has the effect of preventing too rapid a combustion of the starchy constituent of the coating compound and thus prevents undue progressive burning of the starch material in advance of the fusion of the metal core.

In preparing the covering composition, it is sometimes preferable to add a small amount of kaolin to the mixture to obtain a covering of suitable body and thickness without employing an excessive amount of volatile starchy material. In this way the amount of gas generated in the distillation of the materials forming the covering may be predetermined independently of the thickness and body of the covering.

A small percentage of moisture is preferably left in the covering to act as a cooling agent for the rod by reason of its absorption of heat in vaporizing.

The distillation of the starchy material by the heat of the arc forms a deoxidizing atmosphere surrounding the arc, and the carbon residue constitutes a crater-like formation surrounding the fusing end of the weldrod. This carbon crater also provides a carbon arc surrounding the metallic arc and tending to protect the metallic vapors or molten particles from impurities which might otherwise come in contact therewith. The carbon arc and the deoxidizing atmosphere produced by the coating also tends to stabilize the arc, thus enabling the employment of larger weldrods and higher amperage to obtain higher speed welding.

I claim:

1. A covered weldrod for electric arc welding comprising a metallic rod provided with an adherent covering containing a starchy material as the principal constituent thereof.

2. A covered weldrod for electric arc welding comprising a metallic rod provided with an adherent covering containing a starchy flour as the principal constituent thereof.

3. A covered weldrod for electric arc welding comprising a metallic rod provided with an adherent covering containing wheat flour as the principal constituent thereof.

4. A covered weldrod for electric arc welding comprising a metallic rod provided with a covering formed from a mixture of starchy material and an alkaline silicate.

5. A covered weldrod for electric arc welding comprising a metallic rod provided with a covering having desirable arc producing characteristics and containing starchy flour and a combustion retarder therefor.

6. A covered weldrod for electric arc welding comprising a metallic rod provided with a baked covering containing a starchy material as its principal constituent.

7. A covered weldrod for electric arc welding comprising a metallic rod provided with a homogeneous covering of starchy material of substantially uniform thickness, said covering acting to desirably protect the welding arc.

8. A weldrod for electric arc welding comprising a metal rod and an adherent covering thereon containing a starchy material as its principal constituent, a small amount of kaolin, and sodium silicate.

In testimony whereof, I have signed my name at Milwaukee, Wisconsin, this 16th day of April, A. D. 1929.

RICHARD STRESAU.